US 8,429,122 B2

(12) United States Patent
Martin et al.

(10) Patent No.: US 8,429,122 B2
(45) Date of Patent: Apr. 23, 2013

(54) METHOD, SYSTEM AND APPARATUS FOR REMOTE DATA SEARCHING

(75) Inventors: Daryl Joseph Martin, Kitchener (CA); James Andrew Godfrey, Waterloo (CA); John Ferguson Wilson, Waterloo (CA)

(73) Assignee: Research in Motion Limited, Waterloo, ON (CA)

( * ) Notice: Subject to any disclaimer, the term of this patent is extended or adjusted under 35 U.S.C. 154(b) by 243 days.

(21) Appl. No.: 12/784,602

(22) Filed: May 21, 2010

(65) Prior Publication Data

US 2011/0289051 A1  Nov. 24, 2011

(51) Int. Cl.
*G06F 7/00*  (2006.01)
*G06F 17/30*  (2006.01)

(52) U.S. Cl.
USPC ..................... 707/612; 707/614; 707/621

(58) Field of Classification Search .......... 707/612, 707/614, 621, 622
See application file for complete search history.

(56) References Cited

U.S. PATENT DOCUMENTS

| 6,230,156 | B1 | 5/2001 | Hussey |
| 7,142,883 | B2 | 11/2006 | Rouse et al. |
| 7,321,930 | B2 * | 1/2008 | Ferguson et al. ............. 709/223 |
| 7,359,991 | B2 | 4/2008 | Balducci et al. |
| 7,539,665 | B2 * | 5/2009 | Mendez ................................. 1/1 |
| 7,698,282 | B2 * | 4/2010 | Subramaniam et al. ...... 707/715 |
| 2003/0097358 | A1 | 5/2003 | Mendez |
| 2003/0157947 | A1 | 8/2003 | Fiatal et al. |
| 2005/0021867 | A1 * | 1/2005 | Partanen et al. ............. 709/248 |
| 2005/0187971 | A1 | 8/2005 | Hassan et al. |
| 2006/0031198 | A1 * | 2/2006 | Newbold et al. .................. 707/3 |
| 2006/0259494 | A1 | 11/2006 | Watson et al. |
| 2007/0050346 | A1 | 3/2007 | Goel et al. |
| 2007/0174246 | A1 * | 7/2007 | Sigurdsson et al. ............. 707/3 |
| 2008/0005697 | A1 | 1/2008 | Jung |
| 2008/0022057 | A1 | 1/2008 | Shah |
| 2008/0109521 | A1 | 5/2008 | Mousseau et al. |
| 2009/0063448 | A1 * | 3/2009 | DePue et al. ....................... 707/5 |
| 2009/0125513 | A1 * | 5/2009 | Newbold et al. .................. 707/5 |
| 2009/0164667 | A1 * | 6/2009 | Zhang et al. ................. 709/248 |
| 2009/0234823 | A1 * | 9/2009 | Wong ................................. 707/4 |
| 2009/0281991 | A1 * | 11/2009 | Huynh et al. ..................... 707/3 |

FOREIGN PATENT DOCUMENTS

EP    1566747 A1    8/2005

OTHER PUBLICATIONS

LinkSoftSecret! Strong Encryption for Your Data, downloaded on Mar. 27, 2008 from http://linkesoft.com/secret/pocketpc.html.
European Patent Application No. 10163549.8 Search Report mailed Oct. 6, 2010.

* cited by examiner

*Primary Examiner* — Jeffrey A Burke
(74) *Attorney, Agent, or Firm* — Perry + Currier

(57) ABSTRACT

A method and apparatus for remote searching of data stored on a communication device is provided. The communication device is generally in communication with a server for tracking data associated with the communication device and data associated with a synchronizable computing device, synchronizable with the communication device. An index of data stored at the communication device is maintained at the server, the index for distinguishing the data stored at the communication device from data stored at the synchronizable computing device. A searchable copy of data stored on the communication device cross-referenced to the index is maintained, the searchable copy searchable using search parameter data received from the communication device to produce search results transmittable back to the communication device.

15 Claims, 3 Drawing Sheets

METHOD, SYSTEM AND APPARATUS FOR REMOTE DATA SEARCHING

FIELD

The specification relates generally to computing devices, and specifically to a method, system and apparatus for remote data searching.

BACKGROUND

As the storage abilities of mobile electronic devices grow, it becomes more challenging to search for data both on and off a device: the processing capability of such devices is generally limited, as are the power capabilities. As a rule of thumb the larger the data is on a device then the longer it takes to find a data (e.g. document/e-mail) being searched for. Furthermore, to minimize power consumption, searching algorithms usually do not do any in-depth searching but just simple string comparisons, hence the results may not be useful. While remote searching of data has been suggested, such remote searching generally occurs upon a larger body of data than is stored on the device and hence search results may not be pertinent to data stored at the device: to view the data contained in the search results it may be necessary to request the data from a remote device.

BRIEF DESCRIPTIONS OF THE DRAWINGS

Embodiments are described with reference to the following figures, in which.

DETAILED DESCRIPTION OF THE EMBODIMENTS

Figure 1:
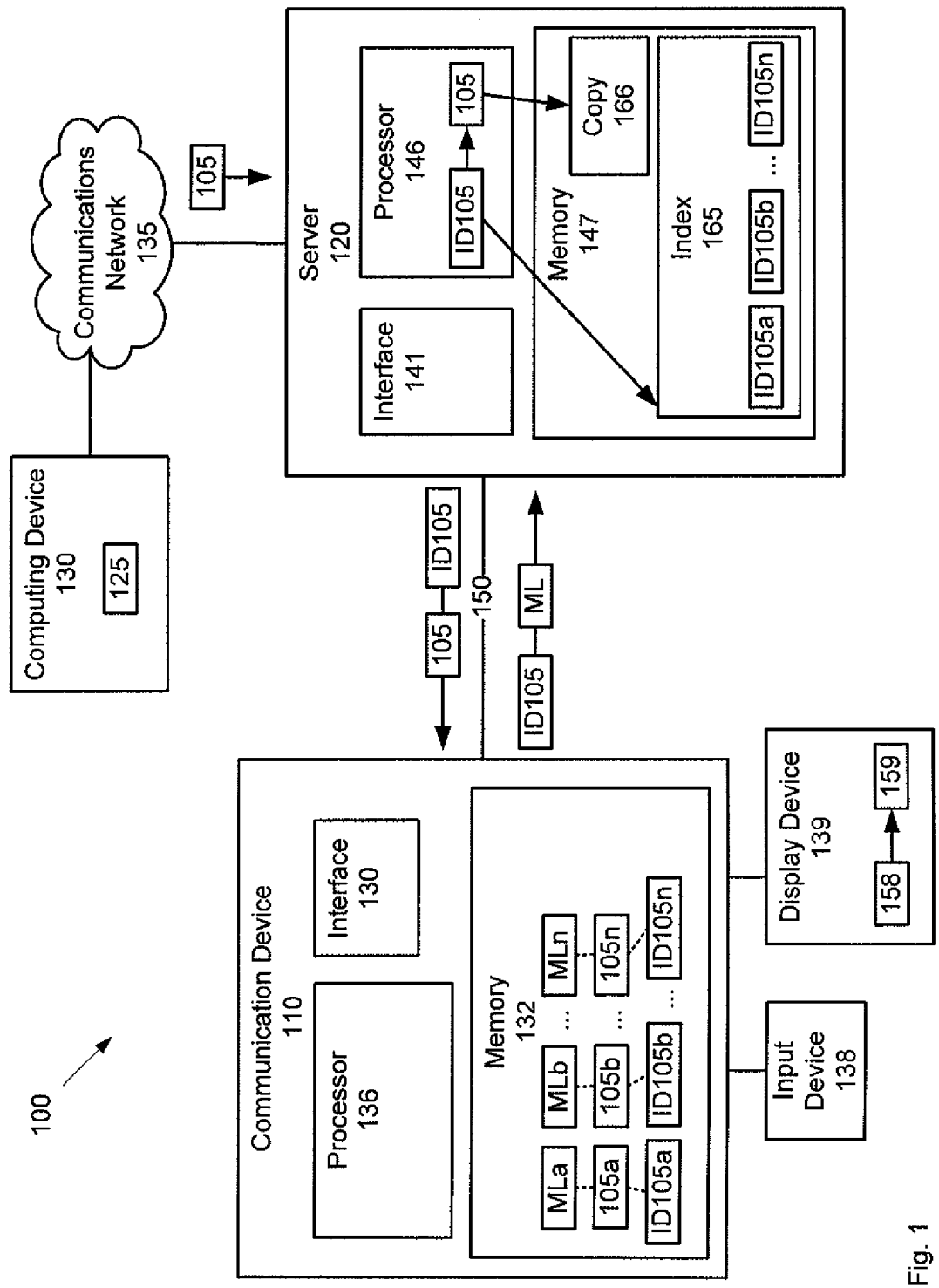
FIG. 1 depicts a system for remote searching of data, according to non-limiting embodiments.

A first aspect of the specification provides a method for remote searching of data stored on a communication device, the communication device in communication with a server for tracking data associated with the communication device and data associated with a synchronizable computing device, synchronizable with the communication device. The method comprises maintaining, at the server, an index of data stored at the communication device, the index for distinguishing the data stored at the communication device from data stored at the synchronizable computing device. The method further comprises maintaining a searchable copy of data stored on the communication device, cross-referenced to the index, the searchable copy searchable using search parameter data received from the communication device to produce search results transmittable back to the communication device.

The method can further comprise: receiving, from the communication device, the search parameter data; searching the searchable copy, using the search parameter data, to produce the search results; and transmitting the search results, to the communication device. The method can further comprise synchronizing the index of data and the searchable copy with the data stored at the communication device prior to searching the searchable copy.

The method can further comprise synchronizing the index of data and the searchable copy with the data stored at the communication device.

The index of data can include respective locations of the data stored at the communication device. The search results can comprise respective locations of the search results on the communication device.

The data stored on the communication device can comprise at least one of message data, attachments to messages, calendar data, contact data, note data, memo data and task data.

The searchable copy can be maintained at, at least one of the server and a remote computing device in communication with the server.

A second aspect of the specification provides a server for remote searching of data stored on a communication device. The server comprises a communication interface enabled to communicate with the communication device and a synchronizable computing device, synchronizable with the communication device. The server further comprises a memory enabled to store an index of data stored at the communication device. The server further comprises a processing unit in communication with the communication interface and the memory, the processing unit enabled to: track data associated with the communication device and data associated with the synchronizable computing device; maintain the index of data, the index for distinguishing the data stored at the communication device from data stored at the synchronizable computing device; and maintain a searchable copy of data stored on the communication device cross-referenced to the index, the searchable copy searchable using search parameter data received from the communication device to produce search results transmittable back to the communication device.

The processing unit can be further enabled to: receive, from the communication device, via the communication interface, the search parameter data; search the searchable copy, using the search parameter data, to produce the search results; and transmit the search results to the communication device, via the communication interface. The processing unit further can be enabled to synchronize the index of data and the searchable copy with the data stored at the communication device prior to the searching the searchable copy.

The processing unit can be further enabled to synchronize the index of data and the searchable copy with the data stored at the communication device.

The index of data can include respective locations of the data stored at the communication device. The search results comprise respective locations of the search results on the communication device.

The data stored on the communication device can comprise at least one of message data, attachments to messages, calendar data, contact data, note data, memo data and task data.

The searchable copy can be maintained at, at least one of the memory and a remote computing device in communication with the server.

A third aspect of the specification provides a computer program product, comprising a computer usable medium having a computer readable program code adapted to be executed to implement a method for remote searching of data stored on a communication device, the communication device in communication with a server for tracking data associated with the communication device and data associated with a synchronizable computing device, synchronizable with the communication device. The method comprises maintaining, at the server, an index of data stored at the communication device, the index for distinguishing the data stored at the communication device from data stored at the synchronizable computing device. The method further comprises maintaining a searchable copy of data stored on the communication device, cross-referenced to the index, the searchable copy searchable using search parameter data received from the communication device to produce search results transmittable back to the communication device.

FIG. 1 depicts a system 100 for remote searching of data 105a, 105b, . . . 105n stored on a communication device 110, according to non-limiting embodiments. Data 105a, 105b, . . . 105n is generically and collectively referred to as data 105, and can comprise any suitable combination of message data, attachments to messages, calendar data, contact data, note data, memo data and task data.

Communication device 110 is in communication with a server 120 via a link 150. The link 150 can be wireless or wireless as desired; link 150 can further comprise any suitable communication network. In general server 120 is enabled to track data 105 associated with communication device 110 and data 125 associated with a synchronizable computing device 130, in communication with server 120 via a communications network 135. In some embodiments, link 150 can comprise communication network 135. Furthermore, communication device 110 can be synchronized with computing device 130, via server 120, in any desired manner.

However, computing resources at communication device 110 are generally less powerful than computing resources at computing device 130 (e.g. i.e. communication device 110 will generally comprise a slower processor and have less memory than computing device 130). Hence data 105 at communication device 110 is generally a subset of data 125 at computing device 130. For example, computing device 130 can be enabled to store thousands of e-mails (e.g. data 125), while communication device 110 can be enabled to store a subset (e.g. data 105) of the thousands of e-mails. In some non-limiting embodiments, computing device 130 comprises a MAPI (Messaging Application Programming Interface) server and communication device 110 comprises a mobile communication device such as PDA (Personal Digital Assistant) enabled to receive and process messages/e-mail.

In any event, communication device 110 generally comprises any suitable communication/computing device, including but not limited a laptop computer, a PDA, a cellphone, and the like, and/or a combination.

In an event, communication device 110 generally comprises any suitable communication/computing device, including but not limited a laptop computer, a PDA, a cellphone, and the like, and/or a combination.

Communication device 110 comprises a communication interface 130 enabled to communicate with server 120, interface 130 being generally compatible with link 150. That is, if link 150 comprises a wireless link, interface 130 is enabled to communicate wirelessly, using any suitable protocol (including but not limited to WiFi, WiMax and/or cellular telephone protocols); and/or if link 150 comprises a wired link, then interface 130 is enabled to communicate via a wired link (including but not limited to both remote and local links, such as USB/serial cables, and/or a wired communication network), using any suitable wired protocol.

Communication device 110 further comprises a memory 132 for storing data 105. Memory 132 can comprise any suitable memory device, including but not limited to random access memory (RAM), removable memory, memory cards, hard disks, and the like.

Communication device 110 further comprises a processor 136 in communication with interface 130 and memory 132, for example via a suitable computer bus (not depicted). Processor 136 comprises any suitable processor, including but limited to a central processing unit (CPU).

Communication device 110 can also be in communication with any suitable input device 126, or combination of input devices. Input device 126 is generally enabled to receive input data, and can comprise any desired combination of suitable input devices, including but not limited to a keyboard, a pointing device, a mouse, a track wheel, a touchpad, a touch screen and the like.

Communication device 110 can also be in communication with any suitable display device 139. The display device 139 can include, but is not limited to, a flat panel display (e.g. a liquid crystal display (LCD), plasma, and the like), a cathode ray tube (CRT), a computer monitor, and the like. Display device 139 comprises circuitry 158 for generating a representation 159 of data 105 or any other suitable data including but not limited to graphical user interfaces (GUI). Display device 139 can include any suitable combination of CRT and/or flat panel displays (e.g. LCD, plasma and the like), and circuitry 158 can include any suitable combination of circuitry for controlling the CRT and/or flat panel displays etc., including but not limited to display buffers, transistors, electron beam controllers, LCD cells, plasmas cells, phosphors etc. In particular, display device 139 and circuitry 158 can be controlled by processor unit 136 to generate representation 159.

In some embodiments, communication device 110 can comprise input device 138 and display device 139.

Server 120 generally comprises any suitable computing device for tracking data 105 and data 125. Server 120 can also be enabled to manage synchronization of data between communications device 110 and computing device 130, in any suitable manner. For example, if data 105a is deleted at communication device 110, corresponding data within data 125 can be deleted in some embodiments, but is not deleted in other embodiments. Server 120 generally manages these processes and to keep communication device 110 and computing device 130 synchronized in accordance with pre-defined synchronization rules, and/or commands from communication device 110 and/or computing device 130.

Server 120 generally comprises a communication interface 141, which can be similar to interface 130, interface 141 generally compatible with link 150, and for communication with computing device 130 via communications network 135. Server 120 further comprises a memory 147 for storing an index 165 of data stored at communication device 110, and a searchable copy 166 of data stored on communication device 110 cross-referenced to index 165. In particular, index 165 distinguishes data 105 stored at communication device 110 from data 125 stored at synchronizable computing device 130. For example, data 105 is generally transmitted to communication device 110 via server 120, and data 125 is generally transmitted to computing device 130 via server 120, with data 105 generally comprising a subset of data 125. In the prior art, servers similar to server 120 do not always track data 105 and data 125 and/or distinguish between data 105 and data 125, and do not distinguish between data 105 and data 125 when performing a remote search. Hence, index 165 generally enables server 120 to distinguish between data 105 and data 125 by indexing data 105 stored at communication device 110.

In some embodiments, one of index 165 or copy 166 can comprise the other of index 165 and copy 166.

Server 120 further comprises a processor 146 for tracking data 105, data 125, managing synchronization between communication device 110 and computing device 130, maintaining index 165 and maintaining copy 166. Processor 146 is further enabled to process search parameter data 180 received from communication device 110 to search copy 166, as described below with reference to FIG. 2.

Index 165 generally comprises a list of identifiers of each data 105a, 105b, . . . 105n stored at communication device 110. For example, system 100 is generally enabled to deliver data 105 to communications device 110 via server 120; server 120 can then be generally enabled to assign an identifier ID105 to each respective data 105*a*, 105*b*, . . . 105*n* before it is transmitted to communications device 110, each identifier ID105 for distinguishing each data 105 from one another. For example, an identifier ID105 of each respective data 105*a*, 105*b*, . . . 105*n* can comprise a unique and/or computationally unique identifier, including but not limited to consecutively assigned alphanumeric identifiers and a hash of each respective data 105, though any suitable identifier is within the scope of present embodiments. Identifier ID105 can be transmitted to communications device 110 along with data 105, identifier ID105 and data 105 stored in memory 132. Furthermore, identifier ID105 is added to index 165 in memory 147, and data 105 is added to copy 166. In some alternative embodiments, data 105 can be processed into a more searchable format (e.g. unformatted text) before being added to copy 166.

In any event, index 165 enables server 120 to distinguish data 105 and data 125, for example in embodiments where memory 147 stores a copy of at least a subset of data 125 that is not in data 105.

In further embodiments, index 165 can comprise a location ML of each data 105 in memory 132. In these embodiments, once data 105 is stored in memory 132, communications device 110 can transmit location ML to server 120 along with identifier ID105, where location ML is added to index 165.

In some non-limiting embodiments, index 165 comprises Table 1:

TABLE 1

| Data Identifier | Memory Location |
|---|---|
| ID105a | MLa |
| ID105b | MLb |
| . . . | . . . |
| ID105n | MLn |

While Table 1 is comprised of rows and columns, index 165 can comprise any suitable format. Furthermore, while Table 1 can have any suitable number of rows and any suitable number of columns. In this embodiment, Table 1 comprises two columns (one for "Data Identifier" and one for "Memory Location"), a header row (comprising the text "Data" Identifier" and "Memory Location"), and a number of rows corresponding to data 105, in a one-to-one relationship. Each "Data Identifier" ID105*a*, ID105*b*, . . . ID105*n*, comprises an identifier of corresponding data 105*a*, 105*b*, . . . 105*n*, as described above. Furthermore, each "Memory Location" comprises a location of corresponding respective data 105 in memory 132.

Copy 166 can comprise data 105 stored in any suitable format. As described above, in some embodiments, data 105 can be processed into a more searchable format (e.g. unformatted text) before being added to copy 166. In some non-limiting embodiments, index 165 comprises Table 2, where data 105 is cross referenced to index 165 using identifiers ID105:

TABLE 2

| Data Identifier | Data |
|---|---|
| ID105a | 105a |
| ID105b | 105b |
| . . . | . . . |
| ID105n | 105n |

While Table 2 is comprised of rows and columns, copy 166 can comprise any suitable format. Furthermore, while Table 2 can have any suitable number of rows and any suitable number of columns. In this embodiment, Table 2 comprises two columns (one for "Data Identifier" and one for "Data"), a header row (comprising the text "Data" Identifier" and "Data"), and a number of rows corresponding to data 105, in a one-to-one relationship. Each "Data Identifier" ID105*a*, ID105*b*, . . . ID105*n*, comprises an identifier of corresponding data 105*a*, 105*b*, . . . 105*n*, as described above. Furthermore, each "Data" comprises data 105 stored in any suitable format.

Figure 2:
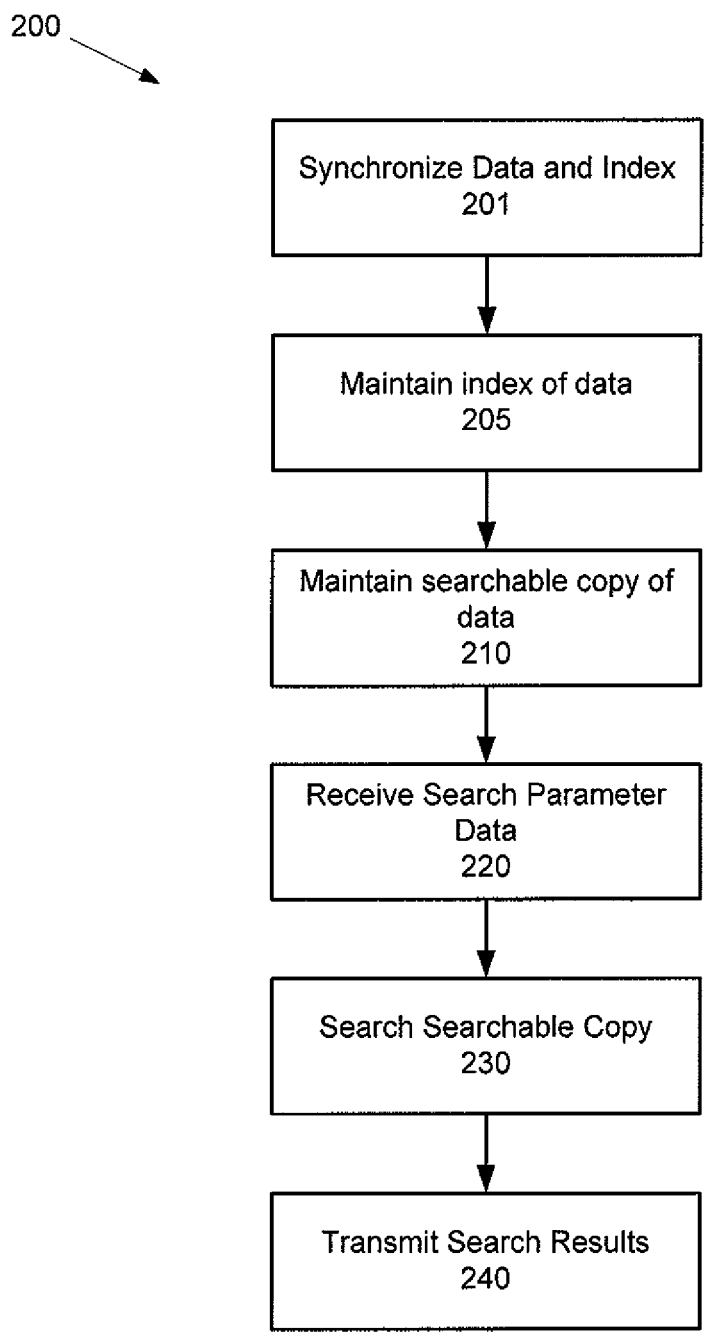
FIG. 2 depicts a method for remote searching of data, according to non-limiting embodiments.

Attention is now directed to FIG. 2 which depicts a method 200 for remote searching of data stored on a communication device. In order to assist in the explanation of the method 200, it will be assumed that the method 200 is performed using the system 100, and in particular server 120. Furthermore, the following discussion of the method 200 will lead to a further understanding of the system 100 and its various components. However, it is to be understood that the system 100 and/or the method 200 can be varied, and need not work exactly as discussed herein in conjunction with each other, and that such variations are within the scope of present embodiments.

At step 201, data 105 is synchronized with index 166 by transmitting synchronization notifications between communications device 110 and server 120 using any suitable manner. For example, if given data 105 is deleted from memory 132, communication device 110 can be enabled to transit a delete notification to server 120, which can be processed by processor 146 such that index 165 and copy 166 are updated to delete the corresponding identifier ID105 and data 105. Similarly, if data 105 is modified at communication device 110, communication device 110 can be enabled to transit a modification notification to server 120, which can be processed by processor 146 such that copy 166 is updated to modify data 105; in these embodiments index 165 is modified if memory location ML of data 105 is modified. Finally, in some embodiments, information can be added to data 105 at the communication device 110, for example via input device 138 and/or via addition of data stored on a removable memory (e.g. a flash memory) and/or a wired synchronization with a computing device other than computing device 130, connected directly to communication device 110, the synchronization bypassing server 120. In these embodiments, new data 105 can be created at communication device 110, communication device 110 can be enabled to transit an addition notification to server 120, including the new data 105, which can be processed by processor 146 such that index 165 and copy 166 are updated accordingly. In these embodiments, further data can be exchanged between communication device 110 and server 120 in the generation and assignment of an identifier ID105 to new data 105 such that data 105, index 165 and copy 166 are synchronized.

In some embodiments, step 201 can occur on an on-going basis as each change to data 105 occurs, in that when data 105 is deleted, modified or added to, then the corresponding notification is transmitted to server 120. In other embodiments, step 201 can occur periodically, with all changes to data 105 being synchronized at once. In further embodiments, step 201 can occur when a search is to be initiated, as in step 220, described below.

At step 205, index 165 is maintained, index 165 for distinguishing data 105 from data 125. For example, as data 105 is transmitted to communication device 110, index 165 is maintained/updated with identifiers ID105 as they are determined, described above. Step 205 can include storing memory locations ML received from communication device 110, as described above.

At step 210, copy 166 is maintained, copy 166 searchable using search parameter data received from communication device 110 to produce search results transmittable back to communication device 110, as described below. For example, as data 105 is transmitted to communication device 110, and index 165 is maintained/updated with identifiers data 105 in any suitable format, described above. In some embodiments, copy 166 can be maintained at yet another remote computing device (not depicted), different from computing device 110 and server 120, the remote computing device in communication with server 120. In these embodiments, synchronization step 201 can occur via server 120, with synchronization notifications transmitted to the remote computing device via server 120.

Steps 201, 205 and 210 can be performed in any suitable order and/or simultaneously. In some embodiments, step 205 and/or step 210 can comprise step 201, with index 165 and/or copy 166 being maintained due to a synchronization.

Figure 3:
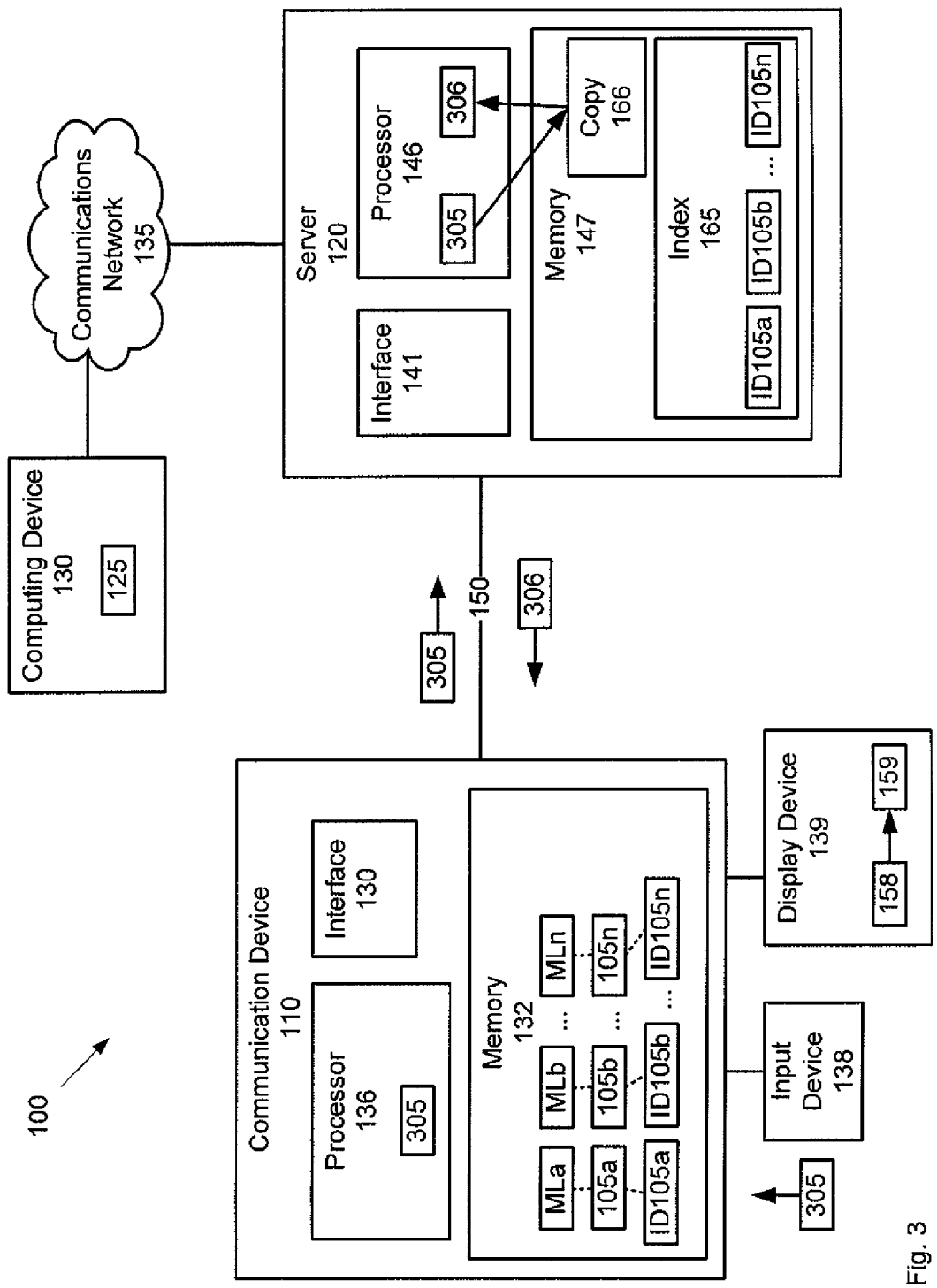
FIG. 3 depicts the system of FIG. 1 performing a search, according to non-limiting embodiments.

At step 220, and as depicted in FIG. 3, search parameter data 305 is received at server 120 from communication device 110. For example, search parameter data 305 can be first received at communication device 110 via input device 138, and in some embodiments, via a GUI provided via representation 159. Search parameter data 305 is then processed by processor 136, processor 136 enabled to transmit search parameter data 305 to server 120 rather than search data 105 stored in memory 132 using search parameter data 305. In some embodiments, processor 136 can be further enabled to search data 105 stored in memory 132 using search parameter data 305 before or after transmitting search parameter data 305 to server 120. In other embodiments, transmission of search parameter data 305 to server 120 occurs upon receiving further input data indicative that a remote search is to be performed.

At step 230, server 120 searches searchable copy 166, using search parameter data 305, to produce search results 306. Any suitable algorithm of any suitable complexity can be applied in searching searchable copy 166 using search parameter data 305. In general, processor 146 can be more powerful (e.g. faster etc.) than processor 136 and hence more robust search algorithms may be used to search copy 166 than could be practically used at communication device 110. Furthermore, index 165 can be processed in order to distinguish between data 125 and data 105, for example in embodiments where memory 147 stores a copy of at least a subset of data 125 that is not in data 105. In some embodiments, if a synchronization notification, described above with reference to step 201, is delayed and/or lost, and hence index 165 is out of date, then server 120 can use out of date index 165 and communication device 110 can filter search results 306 based on data stored in memory 132. Furthermore, if searchable copy 166 is maintained on a remote computing device, server 120 can forward search parameter data 305 to the remote computing device to produce search results 306, which are then transmitted back to server 120; server 120 then processes index 165 in order to distinguish between data 125 and data 105, to further filter search results 306, before transmitting them to communication device 110, as described below.

At step 240, search results 306 are transmitted to communication device 110, where they can be provided in representation 159 via a suitable GUI. Search results 306 can include respective identifiers ID105 and memory locations ML of data 105 provided in search results 306.

In any event, by performing remote searches at server 120, and further by maintaining index 165 and copy 166 to limit remote searches only to data 105, rather than data 125, more complex algorithms may be applied in a search and search results 306 will be limited to a subset of data 105, such that search results 306 are available for processing at communication device 110 rather than having to be requested from a remote computing device such as computing device 130.

Those skilled in the art will appreciate that in some embodiments, the functionality of computing device 110 and server 120 can be implemented using pre-programmed hardware or firmware elements (e.g., application specific integrated circuits (ASICs), electrically erasable programmable read-only memories (EEPROMs), etc.), or other related components. In other embodiments, the functionality of computing device 110 and server 120 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

A portion of the disclosure of this patent document contains material which is subject to copyright protection. The copyright owner has no objection to the facsimile reproduction by any one the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A method for remote searching of data stored on a communication device, said communication device in communication with a server for tracking data associated with said communication device and data associated with a synchronizable computing device, synchronizable with said communication device, the method comprising:
    maintaining, at said server, an index of data stored at said communication device, said index for distinguishing said data stored at said communication device from data stored at said synchronizable computing device;
    maintaining, at said server, a searchable copy of data stored on said communication device, cross-referenced to said index, said searchable copy searchable using search parameter data received from said communication device to produce search results of said data stored on said communication device transmittable back to said communication device;
    receiving, from said communication device, said search parameter data;
    searching, at said server, said searchable copy, using said search parameter data, to produce said search results, wherein said searching excludes said data stored at said synchronizable computing device and not at said communication device; and,
    transmitting said search results, to said communication device.

2. The method of claim 1, further comprising synchronizing said index of data and said searchable copy with said data stored at said communication device prior to said searching said searchable copy.

3. The method of claim 1, further comprising synchronizing said index of data and said searchable copy with said data stored at said communication device.

4. The method of claim 1, wherein said index of data includes respective locations of said data stored at said communication device.

5. The method of claim 4, wherein said search results comprise respective locations of said search results on said communication device.

6. The method of claim 1, wherein said data stored on said communication device comprises at least one of message data, attachments to messages, calendar data, contact data, note data, memo data and task data.

7. The method of claim 1, wherein said searchable copy is maintained at, at least one of said server and a remote computing device in communication with said server.

8. A server for remote searching of data stored on a communication device, said server comprising:
 a communication interface enabled to communicate with said communication device and a synchronizable computing device, synchronizable with said communication device;
 a memory enabled to store an index of data stored at said communication device;
 a processing unit in communication with said communication interface and said memory, said processing unit enabled to:
  track data associated with said communication device and data associated with said synchronizable computing device;
  maintain said index of data, said index for distinguishing said data stored at said communication device from data stored at said synchronizable computing device; and
  maintain, at said server, a searchable copy of data stored on said communication device cross-referenced to said index, said searchable copy searchable using search parameter data received from said communication device to produce search results of said data stored on said communication device transmittable back to said communication device;
 receive, from said communication device, via said communication interface, said search parameter data;
 search, at said server, searchable copy, using said search parameter data, to produce said search results, wherein searching said searchable copy excludes said data stored at said synchronizable computing device and not at said communication device; and
 transmit said search results to said communication device, via said communication interface.

9. The server of claim 8, said processing unit further enabled to synchronize said index of data and said searchable copy with said data stored at said communication device prior to said searching said searchable copy.

10. The server of claim 8, said processing unit further enabled to synchronize said index of data and said searchable copy with said data stored at said communication device.

11. The server of claim 8, wherein said index of data includes respective locations of said data stored at said communication device.

12. The server of claim 11, wherein said search results comprise respective locations of said search results on said communication device.

13. The server of claim 8, wherein said data stored on said communication device comprises at least one of message data, attachments to messages, calendar data, contact data, note data, memo data and task data.

14. The server of claim 8, wherein said searchable copy is maintained at, at least one of said memory and a remote computing device in communication with said server.

15. A computer program product, comprising a non-transitory computer usable medium having a computer readable program code adopted to be executed to implement a method for remote searching of data stored on a communication device, said communication device in communication with a server for tracking data associated with said communication device and data associated with a synchronizable computing device, synchronizable with said communication device, the method comprising:
 maintaining, at said server, an index of data stored at said communication device, said index for distinguishing said data stored at said communication device from data stored at said synchronizable computing device;
 maintaining, at said serer, a searchable copy of data stored, on said communication device, cross-referenced to said index, said searchable copy searchable using search parameter data received from said communication device to produce search results of said data stored on said communication device transmittable back to said communication device;
 receiving, from said communication device, said search parameter data;
 searching, at said server, said searchable copy, using said search parameter data, to produce said search results, wherein said searching excludes said data stored at said synchronizable computing device and not at said communication device; and,
 transmitting said search results, to said communication device.

* * * * *